(12) United States Patent
Testrake

(10) Patent No.: US 9,475,149 B1
(45) Date of Patent: Oct. 25, 2016

(54) OPTICAL DEVICE AND METHOD OF MAKING SAME

(71) Applicant: Testrake Aviation, Inc., Escondido, CA (US)

(72) Inventor: Steven G. Testrake, Escondido, CA (US)

(73) Assignee: TESTRAKE AVIATION, INC., Escondido, CA (US)

( * ) Notice: Subject to any disclaimer, the term of this patent is extended or adjusted under 35 U.S.C. 154(b) by 0 days.

(21) Appl. No.: 15/135,385

(22) Filed: Apr. 21, 2016

Related U.S. Application Data

(60) Provisional application No. 62/152,611, filed on Apr. 24, 2015.

(51) Int. Cl.
  *B23K 23/00* (2006.01)
  *B23K 26/00* (2014.01)
  *G02B 1/04* (2006.01)

(52) U.S. Cl.
  CPC ......... *B23K 26/006* (2013.01); *B23K 26/0006* (2013.01); *G02B 1/04* (2013.01); *B23K 2203/42* (2015.10); *B23K 2203/54* (2015.10)

(58) Field of Classification Search
  CPC ... B23K 26/006; B23K 26/0006; G02B 1/04
  See application file for complete search history.

(56) References Cited

U.S. PATENT DOCUMENTS

| | | | |
|---|---|---|---|
| 2,695,354 A | 11/1954 | Neugass | |
| 3,917,406 A | 11/1975 | Siegler, Jr. | |
| 3,976,364 A | * 8/1976 | Lindemann | G02B 1/06 351/43 |
| 4,092,518 A | 5/1978 | Merard | |
| 4,156,124 A | 5/1979 | Macken et al. | |
| 4,678,333 A | 7/1987 | Anderson | |
| 4,745,837 A | 5/1988 | Rimsa | |
| 4,985,780 A | 1/1991 | Garnier et al. | |
| 4,995,709 A | 2/1991 | Iwata et al. | |
| 5,206,496 A | 4/1993 | Clement et al. | |
| 5,552,938 A | 9/1996 | Sugawara | |
| 5,575,936 A | 11/1996 | Goldfarb | |
| 5,576,377 A | 11/1996 | El Sayed et al. | |
| 5,637,244 A | 6/1997 | Erokhin | |
| 5,801,356 A | 9/1998 | Richman | |

(Continued)

FOREIGN PATENT DOCUMENTS

| | | |
|---|---|---|
| CN | 101152819 A | 4/2008 |
| GB | 1477949 A | 6/1977 |

(Continued)

OTHER PUBLICATIONS

Arvi Kruusing, "Underwater and water-assisted laser processing: Part 2—Etching, cutting and rarely used methods", Optics and Lasers in Engineering 41 (2004) pp. 329-352, Elsevier Science Ltd., Finland.

(Continued)

*Primary Examiner* — David V Bruce
(74) *Attorney, Agent, or Firm* — Procopio Cory Hargreaves and Savitch LLP

(57) ABSTRACT

An optical device and method of making same including the use of 3-D subsurface laser engraving to emplace optical features such as lenses, mirrors, prisms, diffusers, light pipes and waveguides, reticules, apertures, polarizers, beam splitters, arrays, and the like into the interior of solid plastic or glass.

19 Claims, 8 Drawing Sheets

(56) References Cited

U.S. PATENT DOCUMENTS

| | | | |
|---|---|---|---|
| 6,087,617 A | 7/2000 | Troitski et al. | |
| 6,291,551 B1 | 9/2001 | Kniess et al. | |
| 6,686,582 B1 | 2/2004 | Volcker et al. | |
| 6,777,104 B2 | 8/2004 | Colea | |
| 7,704,586 B2 | 4/2010 | Schubel et al. | |
| 8,901,190 B2 * | 12/2014 | Smith | A61F 2/1627 522/2 |
| 2012/0235047 A1 | 9/2012 | Lewellen et al. | |
| 2012/0277857 A1 | 11/2012 | Purchase et al. | |
| 2013/0342903 A1 | 12/2013 | Dugan et al. | |
| 2013/0344684 A1 * | 12/2013 | Bowden | H01L 21/2633 438/463 |
| 2014/0217074 A1 | 8/2014 | Thor | |

FOREIGN PATENT DOCUMENTS

| | | |
|---|---|---|
| JP | 4565082 B2 | 10/2010 |
| JP | 5302611 B2 | 10/2013 |
| WO | 2015040527 A1 | 3/2015 |

OTHER PUBLICATIONS

International Search Report and Written Opinion for International Patent Application No. PCT/US2016/028830 dated Jul. 29, 2016 in 11 pages.

* cited by examiner

OPTICAL DEVICE AND METHOD OF MAKING SAME

CROSS REFERENCE TO RELATED APPLICATION

This application claims the benefit of U.S. Provisional Patent Application No. 62/152,611 filed on Apr. 24, 2015, which is incorporated by reference herein.

FIELD OF THE INVENTION

The present invention relates in general to monolithic optical devices, and, in particular to monolithic optical devices constructed using subsurface machining by lasers.

SUMMARY OF THE INVENTION

An aspect of the invention involves the use of 3-D subsurface laser engraving to emplace optical features such as, but not limited to, lenses, mirrors, prisms, diffusers, light pipes and waveguides, reticules, apertures, polarizers, beam splitters, arrays, and the like into the interior of solid materials, such as, but not limited to, plastic or glass.

Another aspect of the invention involves a system, method, and product by process for using 3-D subsurface laser engraving to emplace optical features such as, but not limited to, lenses, mirrors, prisms, diffusers, light pipes and waveguides, reticules, apertures, polarizers, beam splitters, arrays, and the like into the interior of solid plastic or glass.

An additional aspect of the invention involves a system, method, and product by process for using 3-D subsurface laser engraving in combination with machining or forming to create mechanical and optical features additionally capable of supporting light sources, detectors, and surface coated reflecting or absorbing materials to create optical features.

A further aspect of the invention involves a system, method, and product by process for using 3-D subsurface laser engraving in combination with molding of liquid polymers wherein passive or active electronic devices, light sources, optical features, light sensors, transducers, mechanical fasteners, strengthening materials or fibers, or any kind of device other than the host materials, may be positioned into the cavity of a mold prior to the liquid being poured, such that the devices become an integral part of the assembly after the host material hardens.

A still further aspect of the invention involves a system, method, and product by process for using 3-D subsurface laser engraving in combination with selective doping of a host material such that a characteristic (refractive index, low pass wavelength high pass wavelength, transmissivity, color, reflectance, etc.) of the optical host material is modified under the action of the laser or not, to create an integrated optical feature such as a filter, for marking, or artistic purposes.

Another aspect of the invention involves a system, method, and product by process for using 3-D subsurface laser engraving in combination with machining or forming, femtosecond laser subsurface laser machining for micro-electronic mechanical systems (MEMS) and/or micro-electronic devices and circuits, application of external reflecting or absorbing materials, embedment of devices into the cavity of a mold prior to or after a pour, or doping of the liquid material prior to the pour.

An additional aspect of the invention involves a system, method, and product by process for using 3-D subsurface laser engraving in combination with machining or forming, and application of external reflecting or absorbing materials, to create a light bezel for an aircraft, maritime, automotive, tactical, heavy equipment, medical or industrial instrument panel, or any instrument, control or display panel where lighting is critical to safe operations including visible light and night vision applications.

A further aspect of the invention involves a system, method, and product by process for using 3-D subsurface laser engraving in combination with machining or forming, and application of external reflecting, absorbing or doping materials, to embed stringed, percussion, wind, keyboard and synthesized musical instruments constructed of clear or opaque bodies with optical, electronic, lighting and visual features for artistic and performance effect that are under the control of a scripted electronic computer-controller, or in response to the musical signature of the instrument, or both.

Another aspect of the invention involves a method for using 3-D subsurface laser engraving to emplace optical features into an interior of a base/host material comprising one or more of the following steps: an optical assembly, a subassembly machine, an object, a device, and an end-item are designed and an optical is selected; base material compositions and dopants to achieve optical, performance, and functional requirements are selected; tooling, molds, and object specific processes such as required laser wavelength steps, etc. are designed; product and tooling designs are transformed into 2-D and 3-D models, chemical formulations and detailed production, machining and lasing steps; 2-D and 3-D models are transferred to computing device(s) and features and details of device to be machined are loaded; a plurality of tooling, fixtures, molds, piece parts, object specific processes required to produce the end-items are acquired; the plurality of piece parts, subassemblies, electronic or optical devices, components, machines, conductors, displays, temporary holding fixtures, etc. are assembled into mold cavity; a plurality of base host materials are prepared in an unsolidified state and dopants, markers, pigments, anti-pigments, additives, catalysts, etc. are added; the base material is poured into the mold to encapsulate/embed the parts/devices and the material is cured into solid form under controlled conditions; after mold release and curing, a plurality of manufacturing processes such as subsurface laser engraving, femtosecond laser machining, surface laser engraving are applied; after mold release and curing, a plurality of manufacturing processes such as machining, turning, extruding, forming, heat treating, cavity formation, sealant, dam, or fixture removal, or final finishing polishing, processes are applied.

An additional aspect of the invention involves an optical device, comprising a monolithic base material having a material construction of at least one of glass material and a polymer material, and an interior; at least one optical feature having the same material construction as the monolithic base material and emplaced entirely within the interior of the monolithic base material, the at least one optical feature including at least one of a lens, a mirror, a partially reflective mirror, a reflector, a prism, a filter, a diffuser, a light pipe, a waveguide, a reticule, an aperture, a polarizer, a beam splitter, and an array.

One or more implementations of the aspects of the invention described above, and especially the aspect of the invention described immediately above, includes one or more of the following: the material construction is a glass material and is at least one of clear glass, colored glass, optical crystals, and organic glass; the material construction is a polymer material and is at least one of polycarbonate, acrylonitrile, and polymethacrylate; the monolithic base material includes a dopant of at least one of chemicals, organic pigments, dies, glass, metallic oxides, metals, and metallic oxides; the optical device is a light plate of an instrument light bezel of an instrument panel, the light bezel further including an instrument panel glass cover with a top surface, the at least one optical feature is a lens integrally formed in the light plate, the light plate including an aperture adjacent to the lens so that light from the light plate is directed and diffused by the lens through the aperture so that a majority of the light is substantially evenly distributed across the top surface of the instrument panel glass cover; the monolithic base material includes a light source of at least one of a LED light source, an incandescent light source, a liquid crystal display, and an electroluminescent light source; the monolithic base material includes a detector of at least one of a photodiode, a charge couple device, and a photo electric cell; the optical device is at least one of a magnifier, a collimator, an interferometer, a refractometer, a spectrometer, and a polarimeter; the at least one optical feature includes two or more optical features of a lens, a mirror, a partially reflective mirror, a reflector, a prism, a filter, a diffuser, a light pipe, a waveguide, a reticule, an aperture, a polarizer, a beam splitter, and an array; the optical device is an optical device of at least one of a liquid crystal display (LCD), a television set, a security system, a vision system, a robotic appliance, a robotic accessory, a camera, an imager, a fiber optic coupler, an illumination system, a system, merchandizing equipment, advertising equipment, a scientific instrument, a clinical instrument, a night vision system, industrial process equipment, manufacturing equipment, a durable medical instrument, disposable medical instrument, an automotive lighting device, an automatic display device, construction equipment, construction material, furniture, a marine instrument panel, and an aerospace instrument panel; the at least one of a mechanical device, an electrical device, and an electronic device include at least one of a electro-optical fiber, a transmitter, an emitter, an electro-optical sensor, an electro-optical detector, a light source, a laser source, an electrical conductor, an electrical semi-conductor, a terminator, an electrical connector, an optical connector, a magnetic device, an electromagnetic device include at least one of a toroid, a coil, a winding, a stator, and a transformers, a hall effect sensor, a radio frequency identification (RFID) circuit, an integrated circuit, an electronic circuit card assembly (CCA), a radio frequency devices, a radio frequency antenna, a mechanical fastener, strengthening material, a fiber, a transducer, a thermocouple, a heating element, and a magnet; the monolithic base material includes at least one of a mechanical device, an electrical device, an electro mechanical device, and an electronic device; the monolithic base material includes at least one cavity and at least one seal to accommodate the at least one of a mechanical device, an electrical device, an electro mechanical device, and an electronic device; the monolithic base material includes at least one of a plunger, a bearing, a shaft, an actuator, a valve, a hinge, a linear actuator, a rotating device, a turbine, a rotor, a motor, a generator, seals, and a sealing device; the optical device is made by a method comprising providing the monolithic base material having a material construction of at least one of glass material and a polymer material, and an interior; forming the monolithic base material by at least one of molding, extruding, blowing, pressing, and machining; emplacing at least one optical feature including at least one of a lens, a mirror, a partially reflective mirror, a reflector, a prism, a filter, a diffuser, a light pipe, a waveguide, a reticule, an aperture, a polarizer, a beam splitter, and an array entirely within the interior of the monolithic base material by 3-D subsurface laser engraving; the method further comprises modifying the optical properties of the host material by at least one of coloring, marking, pigmenting, and texturing by adding at least one of a dopant, a pigment, and an anti pigment; the monolithic base material includes an external surface and the method further comprises optical machining the external surface of the monolithic base material; the method further comprises combining with the at least one optical feature at least one of a LED light source, an incandescent light source, a liquid crystal display, an electroluminescent light source, a photodiode, a charge couple device, and a photo electric cell; the method further comprises combining with the at least one optical feature at least one of a mechanical device, an electrical device, an electro mechanical device, and an electronic device, and femtosecond laser subsurface laser machining at least one of the mechanical device, the electrical device, the electro mechanical device, and the electronic device; and/or the method further comprises providing least one cavity and at least one seal to accommodate the at least one of the mechanical device, the electrical device, the electro mechanical device, and the electronic device.

BRIEF DESCRIPTION OF DRAWINGS

The accompanying drawings, which are incorporated in and form a part of this specification illustrate embodiments of the invention and together with the description, serve to explain the principles of the invention.

DETAILED DESCRIPTION OF THE INVENTION

Figure 2A:
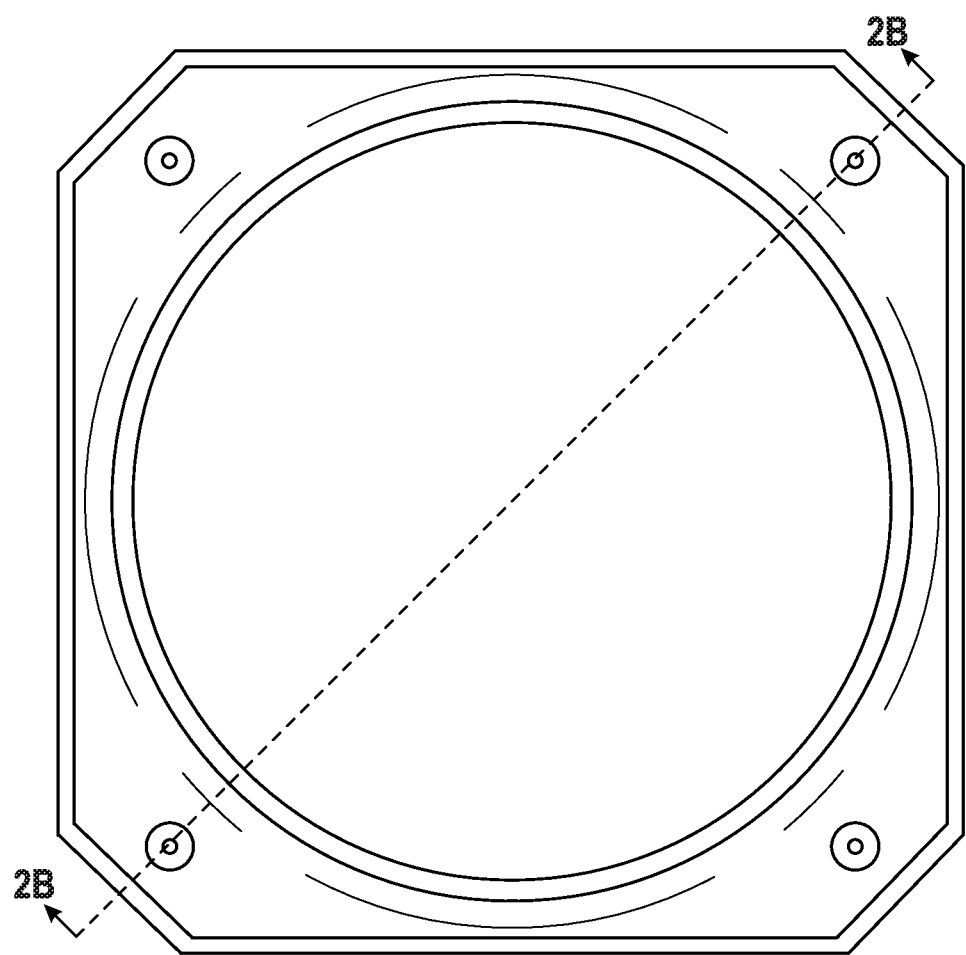
FIG. 2A front elevational view of a light bezel mounted to an is a instrument panel of an aircraft.
Figure 2B:
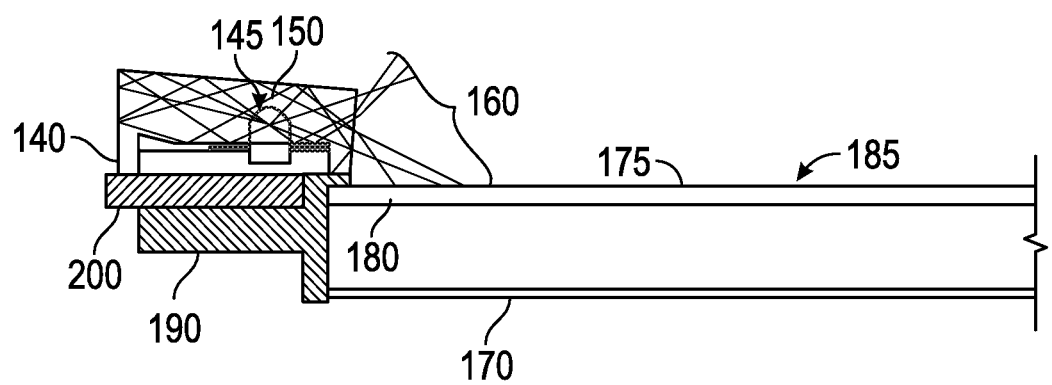
FIG. 2B is a partial cross-section al view of the prior art light bezel of FIG. 2A, taken along line 2B-2B of FIG. 2A, and illustrates a distribution of light within an d from the prior art light bezel.
Figure 3:
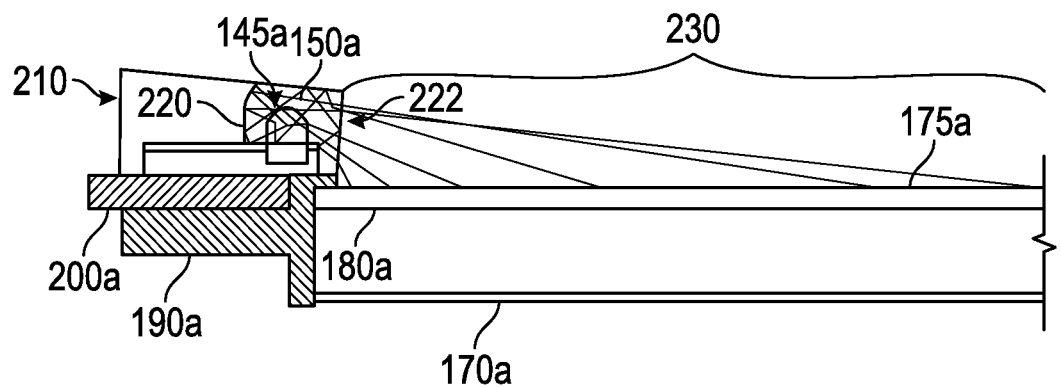
FIG. 3 is a partial cross-sectional view similar to that of FIG. 2B shows a light bezel in accordance with an embodiment of the present invention and illustrates a distribution of light within the light bezel.

With reference to FIGS. 1 to 3, an embodiment of a system 8, method 400, and product by process for using 3-D subsurface laser engraving to emplace optical features such as lenses, mirrors, prisms, diffusers, light pipes and waveguides, reticules, apertures, polarizers, beam splitters, arrays, and the like into the interior of solid material/host such as, but not limited to, plastic or glass will be described. An aspect of the invention involves the emplacement mirrors and other optical features inside a bezel ring in order to precisely diffuse and direct the light such that it is evenly distributed across the face of the instrument while minimizing reflected light in to a pilots' eyes. In alternative aspects, embodiments and/or implementations, the solid material/host with optical feature(s) emplaced therein are used for other application(s).

Figure 1A:
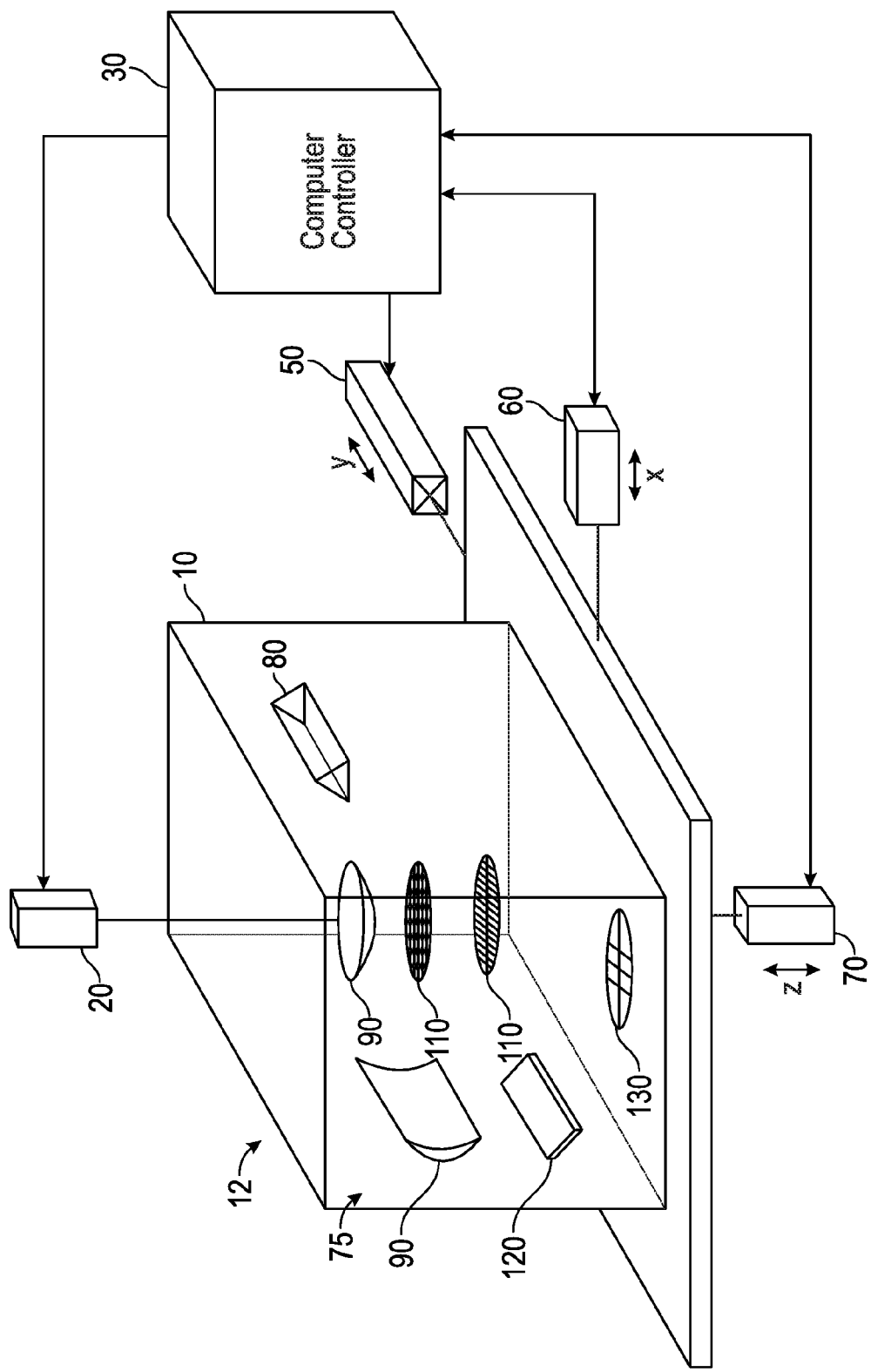
FIG. 1A is a schematic of an embodiment of a system for using 3-D subsurface laser engraving to emplace optical features such as lenses, mirrors, prisms, diffusers, light pipes and waveguides, reticules, apertures, polarizers, beam splitters, arrays, and the like into the interior of solid plastic or glass.
Figure 1B:
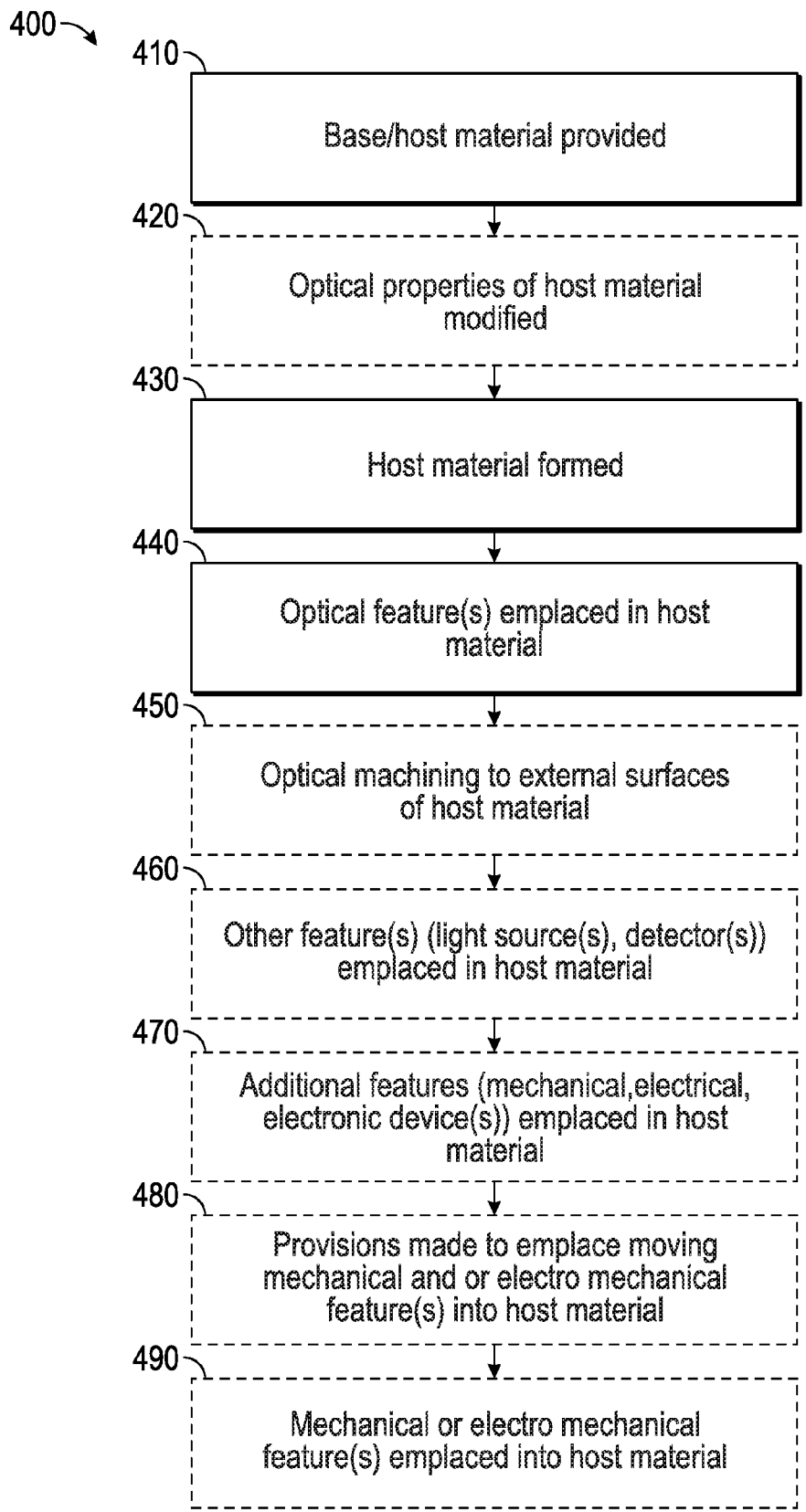
FIG. 1B is a flow chart of an exemplary method for using 3-D subsurface laser engraving to emplace optical features into the interior of a base/host material.

FIG. 1A shows an embodiment of a system 8 and FIG. 1B shows an exemplary method 400 for using 3-D subsurface laser engraving to emplace optical features 75 such as lenses, mirrors, prisms, diffusers, light pipes and waveguides, reticules, apertures, polarizers, beam splitters, arrays, and the like into the interior of base/host material 10 of glass or solid plastic (polymer).

At step 410 a base/host material 10 is provided. The base/host material 10 may be made from, for example, clear glass, colored glass, optical crystals or organic glass, and may be translucent or transparent. Alternately, base/host material 10 may be made of polymer materials. Examples such as acrylonitrile, poly(meth)acrylate (commonly referred to as "acrylic"), polycarbonate, cyclic olefin polymer (COP), cyclic olefin copolymer (COC), polyurethane, and styrene copolymers, silicones, polysulfone, polyether sulfone, polyesters, and polyurethane are typical for polymer based optics.

At optional step 420, optical properties of the host material are modified. The host material 10 may be doped while still in a liquid state with elements or chemicals that are selected to react with the host materials and specific wavelengths and characteristics of the laser light. Optical properties of the host material may be modified by coloring, marking, pigmenting, texturing, etc. a host material by adding dopants, pigments and anti pigments. When properly selected, dopants including, for example, but not by way of limitation, chemicals, organic pigments and dies, glass, metallic oxides, metals, metallic oxides, or combinations thereof, may be properly mixed with the host materials such that they cooperate with the characteristics of the laser to modify the optical properties of the host in a controlled and predictable manner, producing color variations of any kind. Femtosecond micromachining lasers applied to doped glass or polymer host materials may be used to tune the mechanical, electrical and optical properties of the host materials with greatly reduced localized damage at the micro/nano scale. The refractive index of a doped optical material may be modified using femtosecond laser micromachining techniques with scales and accuracies on the order of microns, which illustrates the potential for accurate and repeatable miniaturization of various aspects, features, or embodiments described herein.

At step 430, the monolithic base/host material 10 is formed by, but not limited to, molding, extruding, blowing, pressing, and/or machining.

Once formed, the host material 10 may then be finished, at step 440, by 3-D subsurface laser engraving, which is used to emplace optical features 75 such as lenses, mirrors, prisms, diffusers, light pipes and waveguides, reticules, apertures, polarizers, beam splitters, arrays, and the like into the interior of solid plastic or glass base/host material 10.

At optional step 450, optical machining to external surfaces of the same host material 10 may be performed.

One immediate application is for an instrument light bezel for use in aircraft cockpits, which will be described below with respect to FIGS. 2A through 3. Similarly, the instrument light bezel has applications in farming equipment, heavy construction equipment, military or law enforcement vehicles, boats, or any application requiring proper lighting to assure safe operations. The invention is not limited to visible light, as low light or infrared sources may be used for those applications requiring interoperability with night vision enhancement goggles or the like.

Further, these optical features 75 may be grouped so as to create a monolithic optical device 12 that could previously only be accomplished by assembling individual parts.

At optional step 460, the optical feature(s) 75 is combined with other, additional features such as light sources (e.g. LED, incandescent, liquid crystal displays, electroluminescent, etc.) or detectors (e.g. photodiodes, charge couple devices, photo electric cells). This allows previously complex assemblies to be greatly simplified and manufactured using the monolithic subsurface engraving techniques shown and described herein. Examples are magnifiers, collimators, interferometers, refractometers, spectrometers, polarimeters.

With reference to FIG. 1, the system 8 of 3-D subsurface laser engraving the base material 10 for the monolithic optical device 12 will be described in more detail.

The base material 10 may be made of silica based glass or a plastic such as acrylic, polycarbonate, etc. Laser 20 is capable of precisely controlling the X Y and Z position of the laser beam's focal point, intensity, and duty cycle so that optical features 75 can be machined in the interior of the monolithic optical device 12. The laser 20 is under the control of a computer-controller 30 which stores in its memory the design of the monolithic optical device 12. The wavelength of the laser 20 is selected to react to the material to cause the machining action by laser-damage, rather than allow the laser light to pass through the material. The computer-controller 30 is loaded with the design features and details of the monolithic optical device 12 to be machined including, but not limited to, the coordinates and dimensions of base material 10, and the coordinates and dimensions of the optical features 75 and features that will be machined into the monolithic optical device 12. A computer graphics system may be used for generating a 3-D image inside optically transparent base material 10 by etching a plurality of damage points using laser light to create an image. The system 8 optimizes the number and location of the "etch points", the process flow, and the characteristics of the laser light, while taking into account the properties of the base material 10 to minimize unwanted damage. Additionally, computer-controller 30 may control each of the 3-axis positioners 50, 60, and 70, which function as an alternative method of positioning the focal point of the laser be am within the interior of the base material 10. Platform 40 supports the base material 10 during the machining process, and is acted upon in each of three axis by the articles 50, 60 and 70, under the control of computer-controller 30.

Each of the exemplary optical features 75 that may be integrally engraved into the interior of the base material 10 by the system 8 and method 400 of 3-D subsurface laser engraving will now be described in more detail. In alternative embodiments, the system 8 and method 400 are used to engrave other and/or additional optical features 75 and/or other and/or additional features in the base material 10. Prism 80 is an example of an optical feature 75 that may be engraved into the interior of the monolithic optical device 12. Concave or convex lenses, reflectors, mirrors or partially reflective mirrors 90 may be engraved into the interior of the monolithic optical device 12. Mirrors and lenses 90 are shown in rectangular and circular shapes, but this is for illustrative purposes. In alternative embodiments, the mirrors/lenses 90 may have different shapes than those shown. Diffuser 100 may be engraved into the interior of the monolithic optical device 12. An optical filter 110 may be created within the interior of the monolithic optical device 12. The characteristic of the filter 110 (low pass wavelength high pass wavelength, transmissivity, reflectance, etc.) is established by selective doping of the base material 10 of the monolithic optical device 12 while the material is still in a liquid state, before it has been hardened into the solid form of the base material 10. The dopants are selected to interact with the base material 10 such that during localized destruction or burning the characteristic colors or filter properties are established. A flat mirror 120 may be engraved into the interior of the monolithic optical device. Reticule features 130 may be engraved into the interior of the monolithic optical device 12.

The monolithic optical device 12 may include one or more of the optical features 75 shown/described herein. In further embodiments, the monolithic optical device 12 is not restricted to one optical feature. Numerous optical features may be embedded in the monolithic optical device 12 to create an array of optical features 75 that cooperate with each other and the external surfaces of the monolithic optical device 12 to properly manage the light in the most optimum and preferred manner.

With reference to FIG. 2A-3, one example of how this technology can be applied is illustrated by a light bezel for round, mechanical aircraft instruments. Before describing an embodiment of a light bezel 210 in accordance with an embodiment of the present invention, a light bezel 140 of the prior art will first be described with respect to FIGS. 2A and 2B. As shown in the prior art light bezel 140 of FIGS. 2A and 2B, the light bezel 140 has an exterior shape that has been painted with a reflective coating. A Light Emitting Diode (LED) light source 145 is placed inside of a machined or molded clear plastic (acrylic or polycarbonate) light plate/pipe/emitter 150. All surfaces are painted with reflective paint except for the aperture where light is to illuminate glass cover 180. The plastic light plate/pipe/emitter 150 directs light in a hemispherical pattern towards a top surface 175 of an inner annular surface of the light bezel 140. This inner annular surface has no reflective coatings, and serves as an aperture for directing the light 160 such that it illuminates the glass cover 180 of an instrument face 185, and, by extension, an underlying instrument dial face 170. In this example, the glass cover 180 and underlying instrument dial face 170 are supported by an instrument case 190. It can be readily observed from emanated light ray trace 160 that the majority of light is either concentrated on a small are a near the outer edge of the instrument face 185, or else is directed outward towards the pilot(s). This creates a safety hazard in that stray light diminishes the pilots night-vision, which reduces the pilots' visual acuity under dark ambient lighting conditions. An additional safety hazard is created in that critical information that must be readily visible to the pilot(s) is under illuminated. What the ray trace does not show, but some skilled in the art will readily recognize, is that much of the light is trapped in the interior of the bezel and is therefore converted to heat which is inefficient and wasteful.

An aircraft instrument light bezel must possess characteristics other than good lighting performance. A bezel must be small, light-weight, rugged, reliable, cost effective to manufacture, efficient, and must conform to standard sizes and spacing constraints typically encountered in aviation applications. That optics behave in predicable manners is well known. The fact that a design optimized for good optical properties is fundamentally incompatible with legacy machining, molding or other forming techniques that can be applied to the exterior surfaces of a light bezel, is accepted as an inevitable compromise. Light is needed to be applied precisely and evenly across the face of an instrument, preventing areas of the instrument face from becoming either under or over illuminated, and without causing undue reflections to prevent stray light from affecting a pilot's night vision.

With reference to FIG. 3, an embodiment of a light bezel 210 of the present invention serves to address the limitations of previous art by embedding optical features into the interior of the light bezel 210 using subsurface engraving techniques. Similar elements to those described above with respect to light bezel 140 and FIGS. 2A and 2B will be shown and described with an "a" suffix. Similar to the light bezel 140 the light bezel 210 has an exterior shape that has been painted with a reflective coating. This arrangement enables light pipe/emitter 150a collect and direct light in a hemispherical pattern. A LED light source (or other light source) 145a is positioned within a cavity of a machined or molded clear plastic (acrylic or polycarbonate) bezel or host 210. All surfaces of the bezel 210 are painted with reflective paint except for an aperture where light exits the bezel 210, to illuminate glass cover 180a. The bezel 210 includes an integrally formed lens 222 to direct the diffused light onto the top surface 175 of the glass cover 180a and minimize any stray light being directed away from the instrument face 185a. An integrally formed annular concave reflector/mirror 220 (formed along with the lens 222 within the solid acrylic bezel 210 via the 3-D subsurface laser engraving described and shown with respect to FIG. 1) and lens 222 overcomes the difficulty of the prior art design, where the exterior dimensions of the plastic plate did not lend itself to properly focusing and directing the light (as shown in FIG. 2B, the ray traces 160 are random and scattered). The annular concave reflector 220 and the lens 222 directs light in a controlled manner. It can be readily observed from emitted light ray trace 230 that the majority of light is substantially evenly distributed across a top surface 175a of the glass cover 180a, and, by extension, the underlying instrument face 170a. By adjusting the radius, size, position and focal point of the reflector 220 and/or characteristics of the lens 222, the distribution of the light can be further directed, tuned or tailored to adjust the light distribution to better optimize the illumination to minimize stray light, to reduce glare, to reduce trapped light that is turned to heat, and/or to more efficiently and evenly illuminate the face of the instrument.

Although an embodiment of the invention has been described with respect to creating light pipe(s)/emitter(s) with integral lens(es) and mirror(s), the invention extends beyond aviation instrument panels. The invention has applications including, but not limited to, liquid crystal displays (LCD) and television sets, security systems, vision systems, robotic appliances and accessories, cameras and imagers, fiber optic couplers, illumination and lighting systems, merchandizing and advertising equipment and fixtures, scientific and clinical instruments, night vision systems, industrial process and manufacturing equipment, durable and disposable medical instruments, automotive lighting and display devices, construction equipment and materials, furniture, marine and aerospace instrument panels and applications, etc.

Figure 4:
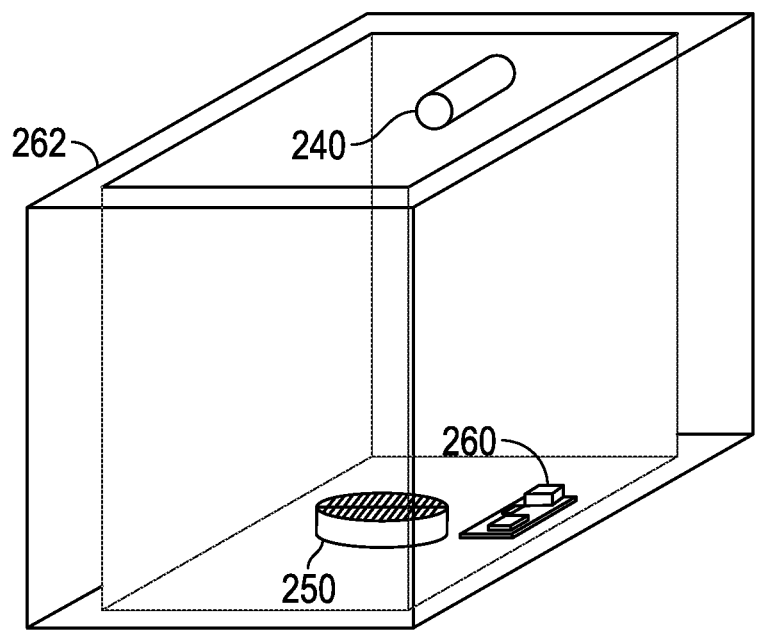
FIG. 4 is a perspective view of an embodiment of a host material with a mechanical device, electrical device, and electronic device shown embedded into the host material.
Figure 5:
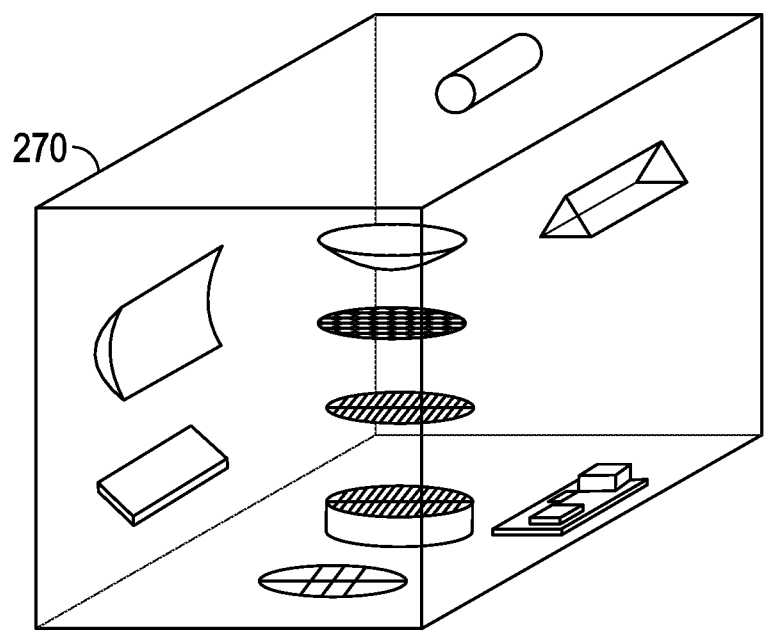
FIG. 5 is a perspective view of an embodiment of a host material with a mechanical device, electrical device, electronic device, and optical features shown embedded into the host material.

FIGS. 4 and 5 illustrate a plurality of devices that may be embedded into the host material while still in a liquid state. At optional step 470, one or more of the following mechanical device(s) 240, electrical device(s) 262, and/or electronic device(s) 260 may additionally be embedded into the host material while still in a liquid state: electro-optical fibers, transmitters and emitters, electro-optical sensors and detectors, light sources, laser sources, electrical conductors and semi-conductors, terminators, electrical or optical connectors, magnetic and electromagnetic devices (toroids, coils, windings, stators, transformers), hall effect sensors, radio frequency identification (RFID) circuits), integrated circuits, electronic circuit card assembliess (CCAs), radio frequency devices and antennas, mechanical fasteners, strengthening materials or fibers, transducers, thermocouples, heating elements, magnets, and/or other devices not readily formed by laser engraving of the basic host materials. The device(s) 240, 250, 260 may be emplaced in mold 262 prior to pouring the liquid host material using precision tooling. After emplacement, while still in liquid form, the host material can be poured, completely encapsulating and integrating the device(s) 240, 250, 260 into the body of the device. After molding the host material, subsurface machining and/or traditional machining and finishing processes may then be applied to finished assembly 270. Alternately, cavities may be formed or machined into the body of the hardened host material to allow emplacement of devices 240, 250, 260 into those cavities to create a plurality of assembled components that are housed by the body. As shown in FIG. 5, the body may include integrally formed optical features created in the manner shown and described with respect to FIG. 1 and/or mechanical device(s) 240, electrical device(s) 250, and/or electronic device(s) 260.

Figure 6:
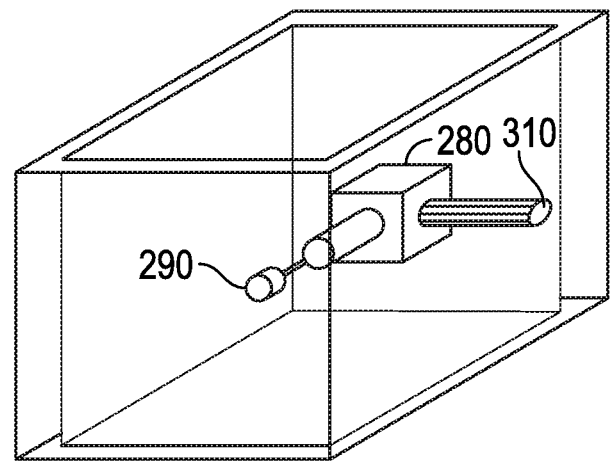
FIG. 6 is a perspective view of an embodiment of a host material with a moving mechanical device embedded into the host material.
Figure 7:
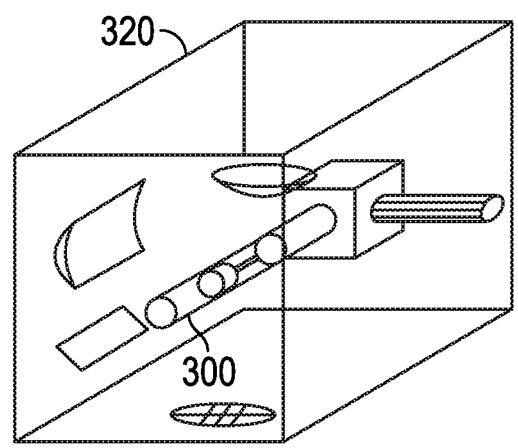
FIG. 7 is a perspective view of an embodiment of a host material with a moving mechanical device embedded into the host material, and optical features shown embedded into the host material.

With reference additionally to FIGS. 6 and 7, at optional step 480, provisions for emplacing moving mechanical or electromechanical feature(s)/device(s) into the body of the device may be accomplished in a manner that is similar to that shown and described with respect to FIGS. 4 and 5, but requires special preparation to avoid contamination, binding, or failure that result by exposure to liquid host materials. For example, FIG. 6 illustrates an electromechanical actuator or solenoid valve 280 with its associated plunger or valve 290 requires freedom of movement. A movable component 290 in this illustration may be temporarily sealed using a seal such as, but not limited to, sealants, dams, blocks, plugs, or the like. The solenoid valve 280 is illustrative of a mechanical device; however, other examples mechanical device(s) that may be used include, but are not limited to, plungers, bearings, shafts, actuators, valves, hinges, linear actuators, rotating devices, turbines, rotors, motors, generators, seals, and/or sealing devices. After provisions are made for the mechanical or electromechanical device(s), at optional step 490, the mechanical or electromechanical device(s) is emplaced into the host material. For example, the sealed mechanical device may be positioned into the cavity of the mold, and the liquefied host material is poured into the mold and allowed to harden. After hardening, at step 490, feature(s) 300 such as required clearances, cavities, tubes or channels will be engraved later via subsurface laser machining, traditional machining, and/or chemical solvents as appropriate, thus removing sealing materials, dams, plugs, blocks, or host materials. Machined feature 310 (e.g., channels, tubes, guides, grooves, pathways, conduits, etc.) can be machined into the host using subsurface or traditional machining techniques. Assembly 320 includes mechanical and/or electromechanical feature(s) and their associated machined features that allow freedom of mechanical motion combined with optical features that have been engraved using subsurface laser engraving techniques. This assembly can be further processed to apply traditional machining and finishing processes to the finished assembly. As shown in FIG. 7, the finished assembly may include integrally formed optical features created in the manner shown and described with respect to FIG. 1, mechanical device(s) 240, electrical device(s) 250, and/or electronic device(s) 260, and/or moving mechanical and/or electromechanical devices.

Figure 1C:
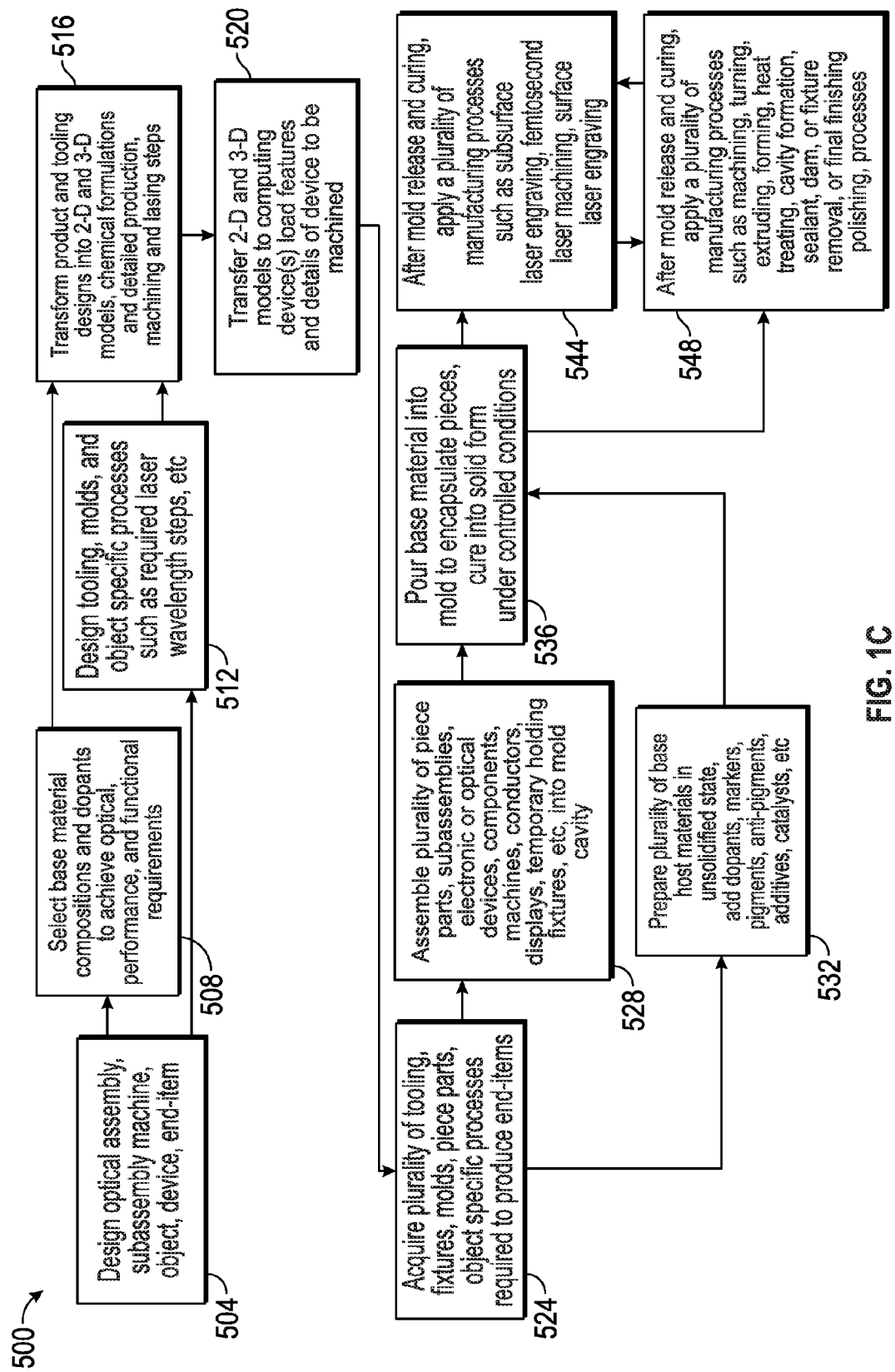
FIG. 1C is a flow chart of another exemplary method for using 3-D subsurface laser engraving to emplace optical features into the interior of a base/host material.

With reference to FIG. 1C, another exemplary method 500 for using 3-D subsurface laser engraving to emplace optical features into the interior of a base/host material will be described. One or more of the steps and/or sub-steps shown and/or described with respect to FIG. 1C may be applied to one or more of the steps and/or sub-steps shown and/or described with respect to FIG. 1B and vice versa.

At step 504, an optical assembly, a subassembly machine, an object, a device, and an end-item are designed.

At step 508, base material compositions and dopants to achieve optical, performance, and functional requirements are selected.

At step 512, tooling, molds, and object specific processes such as required laser wavelength steps, etc. are designed.

At step 516, product and tooling designs are transformed into 2-D and 3-D models, chemical formulations and detailed production, machining and lasing steps.

At step 520, 2-D and 3-D models are transferred to computing device(s) and features and details of device to be machined are loaded.

At step 524, a plurality of tooling, fixtures, molds, piece parts, object specific processes required to produce the end-items are acquired.

At step 528, the plurality of piece parts, subassemblies, electronic or optical devices, components, machines, conductors, displays, temporary holding fixtures, etc. are assembled into mold cavity.

At step 532, a plurality of base host materials are prepared in an unsolidified state and dopants, markers, pigments, anti-pigments, additives, catalysts, etc. are added.

At step 536, the base material is poured into the mold to encapsulate/embed the parts/devices and the material is cured into solid form under controlled conditions.

At step 544, after mold release and curing, a plurality of manufacturing processes such as subsurface laser engraving, femtosecond laser machining, surface laser engraving are applied.

At step 548, after mold release and curing, a plurality of manufacturing processes such as machining, turning, extruding, forming, heat treating, cavity formation, sealant, dam, or fixture removal, or final finishing polishing, processes are applied.

Musical instruments constructed from acrylic, polycarbonate or other materials may be embedded with sound or electrical transducers (pickups), electronic circuitry, and also decorative lighting; whereupon surface and subsurface engraving techniques may then be applied to embed optical and visual features into the instrument for artistic effect. For example, in an internally illuminated electric guitar, illumination sources under external control can change the color of the guitar by emitting different colors, imply motion by sequential flashing, create line sculptures, and relay video information to the performer. By embedding optical features and/or dopants into the body of the instrument, enhanced lighting effects can be realized, providing both artists who design the instrument and artists who perform on the instrument greater flexibility and freedom in their expression of their visual, performing, theatrical and/or musical arts. Light sources may include, but are not limited, to LEDs, LCDs, xenon strobes, incandescent lamps, or a combination of those types.

In further embodiments, musical instruments other than electrical guitars are embedded with sound or electrical transducers (pickups), electronic circuitry, and also decorative lighting. Such musical instruments include, but are not limited to, stringed instruments, keyboard instruments, percussion instruments, wind instruments, and synthesized electronic instruments. Similarly, these embodiments are also not restricted to external lighting controls. In these embodiments, the integration of acoustic and electromagnetic sensors, electronic circuitry such as digital signal processors, filters and amplifiers, digital memory, computer controllers, and light source driving circuitry allows for fully autonomous control of the lighting effects either in response to a programmed script, or in real-time response to the acoustic signature of the instrument, or a combination of both.

Figure 8:
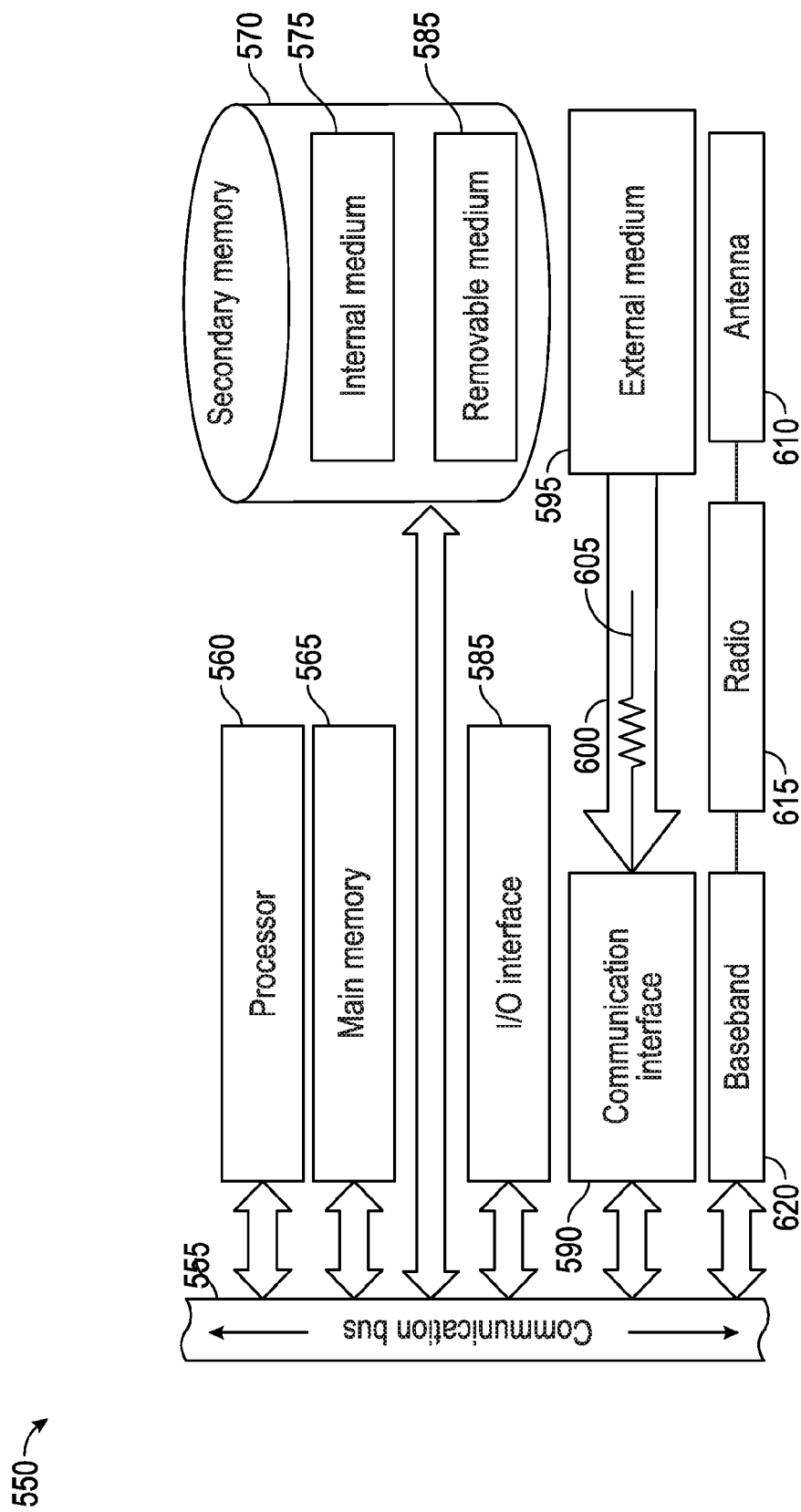
FIG. 8 is a block diagram illustrating an example wired or wireless processor enabled device that may be used in connection with various embodiments described herein.

FIG. 8 is a block diagram illustrating an example wired or wireless system 550 that may be used in connection with various embodiments described herein. For example the system 550 may be used as or in conjunction with the compute r-controller 30 as previously described with respect to FIG. 1 and/or the computing device(s) described with respect to FIG. 1C. The system 550 can be a conventional personal computer, computer server, personal digital assistant, smart phone, tablet computer, or any other processor enabled device that is capable of wired or wireless data communication. Other computer systems and/or architectures may be also used, as will be clear to those skilled in the art.

The system 550 preferably includes one or more processors, such as processor 560. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 560.

The processor 560 is preferably connected to a communication bus 555. The communication bus 555 may include a data channel for facilitating information transfer between storage and other peripheral components of the system 550. The communication bus 555 further may provide a set of signals used for communication with the processor 560, including a data bus, address bus, and control bus (not shown). The communication bus 555 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

System 550 preferably includes a main memory 565 and may also include a secondary memory 570. The main memory 565 provides storage of instructions and data for programs executing on the processor 560. The main memory 565 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 570 may optionally include an internal memory 575 and/or a removable medium 580, for example a floppy disk drive, a magnetic tape drive, a compact disc ("CD") drive, a digital versatile disc ("DVD") drive, etc. The removable medium 580 is read from and/or written to in a well-known manner. Removable storage medium 580 may be, for example, a floppy disk, magnetic tape, CD, DVD, SD card, etc.

The removable storage medium 580 is a non-transitory computer readable medium having stored thereon computer executable code (i.e., software) and/or data. The computer software or data stored on the removable storage medium 580 is read into the system 550 for execution by the processor 560.

In alternative embodiments, secondary memory 570 may include other similar means for allowing computer programs or other data or instructions to be loaded into the system 550. Such means may include, for example, an external storage medium 595 and an interface 570. Examples of external storage medium 595 may include an external hard disk drive or an external optical drive, or and external magneto-optical drive.

Other examples of secondary memory 570 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage media 580 and communication interface 590, which allow software and data to be transferred from an external medium 595 to the system 550.

System 550 may also include an input/output ("I/O") interface 585. The I/O interface 585 facilitates input from and output to external devices. For example the I/O interface 585 may receive input from a keyboard or mouse and may provide output to a display. The I/O interface 585 is capable of facilitating input from and output to various alternative types of human interface and machine interface devices alike.

System 550 may also include a communication interface 590. The communication interface 590 allows software and data to be transferred between system 550 and external devices (e.g. printers), networks, or information sources. For example, computer software or executable code may be transferred to system 550 from a network server via communication interface 590. Examples of communication interface 590 include a modem, a network interface card ("NIC"), a wireless data card, a communications port, a PCMCIA slot and card, an infrared interface, and an IEEE 1394 fire-wire, just to name a few.

Communication interface 590 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 590 are generally in the form of electrical communication signals 605. These signals 605 are preferably provided to communication interface 590 via a communication channel 600. In one embodiment, the communication channel 600 may be a wired or wireless network, or any variety of other communication links. Communication channel 600 carries signals 605 and can be implemented using a variety of wired or wireless communication means including wire or cable, fiber optics, conventional phone line, cellular phone link, wireless data communication link, radio frequency ("RF") link, or infrared link, just to name a few.

Computer executable code (i.e., computer programs or software) is stored in the main memory 565 and/or the secondary memory 570. Computer programs can also be received via communication interface 590 and stored in the main memory 565 and/or the secondary memory 570. Such computer programs, when executed, enable the system 550 to perform the various functions of the present invention as previously described.

In this description, the term "computer readable medium" is used to refer to any non-transitory computer readable storage media used to provide computer executable code (e.g., software and computer programs) to the system 550. Examples of these media include main memory 565, secondary memory 570 (including internal memory 575, removable medium 580, and external storage medium 595), and any peripheral device communicatively coupled with communication interface 590 (including a network information server or other network device). These non-transitory computer readable mediums are means for providing executable code, programming instructions, and software to the system 550.

In an embodiment that is implemented using software, the software may be stored on a computer readable medium and loaded into the system 550 by way of removable medium 580, I/O interface 585, or communication interface 590. In such an embodiment, the software is loaded into the system 550 in the form of electrical communication signals 605. The software, when executed by the processor 560, preferably causes the processor 560 to perform the inventive features and functions previously described herein.

The system 550 also includes optional wireless communication components that facilitate wireless communication over a voice and over a data network. The wireless communication components comprise an antenna system 610, a radio system 615 and a baseband system 620. In the system 550, radio frequency ("RF") signals are transmitted and received over the air by the antenna system 610 under the management of the radio system 615.

In one embodiment, the antenna system 610 may comprise one or more antennae and one or more multiplexors (not shown) that perform a switching function to provide the antenna system 610 with transmit and receive signal paths. In the receive path, received RF signals can be coupled from a multiplexor to a low noise amplifier (not shown) that amplifies the received RF signal and sends the amplified signal to the radio system 615.

In alternative embodiments, the radio system 615 may comprise one or more radios that are configured to communicate over various frequencies. In one embodiment, the radio system 615 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 615 to the baseband system 620.

If the received signal contains audio information, then baseband system 620 decodes the signal and converts it to an analog signal. Then the signal is amplified and sent to a speaker. The baseband system 620 also receives analog audio signals from a microphone. These analog audio signals are converted to digital signals and encoded by the baseband system 620. The baseband system 620 also codes the digital signals for transmission and generates a baseband transmit audio signal that is routed to the modulator portion of the radio system 615. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 610 where the signal is switched to the antenna port for transmission.

The baseband system 620 is also communicatively coupled with the processor 560. The central processing unit 560 has access to data storage areas 565 and 570. The central processing unit 560 is preferably configured to execute instructions (i.e., computer programs or software) that can be stored in the memory 565 or the secondary memory 570. Computer programs can also be received from the baseband processor 610 and stored in the data storage area 565 or in secondary memory 570, or executed upon receipt. Such computer programs, when executed, enable the system 550 to perform the various functions of the present invention as previously described. For example, data storage areas 565 may include various software modules (not shown) that are executable by processor 560.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above figures may depict exemplary configurations for the invention, which is done to aid in understanding the features and functionality that can be included in the invention. The invention is not restricted to the illustrated architectures or configurations, but can be implemented using a variety of alternative architectures and configurations. Additionally, although the invention is described above in terms of various exemplary embodiments and implementations, it should be understood that the various features and functionality described in one or more of the individual embodiments with which they are described, but instead can be applied, alone or in some combination, to one or more of the other embodiments of the invention, whether or not such embodiments are described and whether or not such features are presented as being a part of a described embodiment. Thus the breadth and scope of the present invention, especially in the following claims, should not be limited by any of the above-described exemplary embodiments.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although item, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

I claim:

1. An optical device, comprising:
   a monolithic base material having a material construction of at least one of glass material and a polymer material, and an interior;
   at least one optical feature having the same material construction as the monolithic base material and emplaced entirely within the interior of the monolithic base material, the at least one optical feature including at least one of a lens, a mirror, a partially reflective mirror, a reflector, a prism, a filter, a diffuser, a light pipe, a waveguide, a reticule, an aperture, a polarizer, a beam splitter, and an array,
   wherein the monolithic base material includes at least one of a mechanical device, an electrical device, and an electronic device including at least one of a electro-optical fiber, a transmitter, an emitter, an electro-optical sensor, an electro-optical detector, a light source, a laser source, an electrical conductor, an electrical semi-conductor, a terminator, an electrical connector, an optical connector, a magnetic device, an electromagnetic device include at least one of a toroid, a coil, a winding, a stator, and a transformers, a hall effect sensor, a radio frequency identification (RFID) circuit, an integrated circuit, an electronic circuit card assembly (CCA), a radio frequency devices, a radio frequency antenna, a mechanical fastener, strengthening material, a fiber, a transducer, a thermocouples, a heating element, and a magnet.

2. The optical device of claim 1, wherein the material construction is a glass material and is at least one of clear glass, colored glass, optical crystals, and organic glass.

3. The optical device of claim 1, wherein the material construction is a polymer material and is at least one of polycarbonate, acrylonitrile, and polymethacrylate.

4. The optical device of claim 1, wherein the monolithic base material includes a dopant of at least one of chemicals, organic pigments, dies, glass, metallic oxides, metals, and metallic oxides.

5. An optical device, comprising:
   a monolithic base material having a material construction of at least one of glass material and a polymer material, and an interior;
   at least one optical feature having the same material construction as the monolithic base material and emplaced entirely within the interior of the monolithic base material, the at least one optical feature including at least one of a lens, a mirror, a partially reflective mirror, a reflector, a prism, a filter, a diffuser, a light pipe, a waveguide, a reticule, an aperture, a polarizer, a beam splitter, and an array, wherein the optical device is a light plate of an instrument light bezel of an instrument panel, the light bezel further including an instrument panel glass cover with a top surface, the at least one optical feature is a lens integrally formed in the light plate, the light plate including an aperture adjacent to the lens so that light from the light plate is directed and diffused by the lens through the aperture so that a majority of the light is substantially evenly distributed across the top surface of the instrument panel glass cover.

6. The optical device of claim 1, wherein the monolithic base material includes a light source of at least one of a LED light source, an incandescent light source, a liquid crystal display, and an electroluminescent light source.

7. The optical device of claim 1, wherein the monolithic base material includes a detector of at least one of a photodiode, a charge couple device, and a photo electric cell.

8. The optical device of claim 1, wherein the optical device is at least one of a magnifier, a collimator, an interferometer, a refractometer, a spectrometer, and a polarimeter.

9. The optical device of claim 1, wherein the at least one optical feature includes two or more optical features of a lens, a mirror, a partially reflective mirror, a reflector, a prism, a filter, a diffuser, a light pipe, a waveguide, a reticule, an aperture, a polarizer, a beam splitter, and an array.

10. The optical device of claim 1, wherein the optical device is an optical device of at least one of a liquid crystal display (LCD), a television set, a security system, a vision system, a robotic appliance, a robotic accessory, a camera, an imager, a fiber optic coupler, an illumination system, a system, merchandizing equipment, advertising equipment, a scientific instrument, a clinical instrument, a night vision system, industrial process equipment, manufacturing equipment, a durable medical instrument, disposable medical instrument, an automotive lighting device, an automatic display device, construction equipment, construction material, furniture, a marine instrument panel, and an aerospace instrument panel.

11. The optical device of claim 1, wherein the monolithic base material includes at least one of a mechanical device, an electrical device, an electro mechanical device, and an electronic device.

12. The optical device of claim 11, wherein the monolithic base material includes at least one cavity and at least one seal to accommodate the at least one of a mechanical device, an electrical device, an electro mechanical device, and an electronic device.

13. The optical device of claim 1, wherein the monolithic base material includes at least one of a plunger, a bearing, a shaft, an actuator, a valve, a hinge, a linear actuator, a rotating device, a turbine, a rotor, a motor, a generator, seals, and a sealing device.

14. The optical device of claim 1, wherein the optical device is made by a method comprising:
 a. providing the monolithic base material having a material construction of at least one of glass material and a polymer material, and an interior;
 b. forming the monolithic base material by at least one of molding, extruding, blowing, pressing, and machining;
 c. emplacing at least one optical feature including at least one of a lens, a mirror, a partially reflective mirror, a reflector, a prism, a filter, a diffuser, a light pipe, a waveguide, a reticule, an aperture, a polarizer, a beam splitter, and an array entirely within the interior of the monolithic base material by 3-D subsurface laser engraving.

15. The optical device of claim 14, wherein the method further comprises modifying the optical properties of the host material by at least one of coloring, marking, pigmenting, and texturing by adding at least one of a dopant, a pigment, and an anti pigment.

16. An optical device, comprising:
 a monolithic base material having a material construction of at least one of glass material and a polymer material, an external surface, and an interior;
 at least one optical feature having the same material construction as the monolithic base material and emplaced entirely within the interior of the monolithic base material, the at least one optical feature including at least one of a lens, a mirror, a partially reflective mirror, a reflector, a prism, a filter, a diffuser, a light pipe, a waveguide, a reticule, an aperture, a polarizer, a beam splitter, and an array,
 wherein the optical device is made by a method comprising:
 a. providing the monolithic base material having a material construction of at least one of glass material and a polymer material, and an interior;
 b. forming the monolithic base material by at least one of molding, extruding, blowing, pressing, and machining;
 c. emplacing at least one optical feature including at least one of a lens, a mirror, a partially reflective mirror, a reflector, a prism, a filter, a diffuser, a light pipe, a waveguide, a reticule, an aperture, a polarizer, a beam splitter, and an array entirely within the interior of the monolithic base material by 3-D subsurface laser engraving;
 d. machining the external surface of the monolithic base material.

17. An optical device, comprising:
 a monolithic base material having a material construction of at least one of glass material and a polymer material, and an interior;
 at least one optical feature having the same material construction as the monolithic base material and emplaced entirely within the interior of the monolithic base material, the at least one optical feature including at least one of a lens, a mirror, a partially reflective mirror, a reflector, a prism, a filter, a diffuser, a light pipe, a waveguide, a reticule, an aperture, a polarizer, a beam splitter, and an array,
 wherein the optical device is made by a method comprising:
 a. providing the monolithic base material having a material construction of at least one of glass material and a polymer material, and an interior;
 b. forming the monolithic base material by at least one of molding, extruding, blowing, pressing, and machining;
 c. emplacing at least one optical feature including at least one of a lens, a mirror, a partially reflective mirror, a reflector, a prism, a filter, a diffuser, a light pipe, a waveguide, a reticule, an aperture, a polarizer, a beam splitter, and an array entirely within the interior of the monolithic base material by 3-D subsurface laser engraving;
 d. combining with the at least one optical feature at least one of a LED light source, an incandescent light source, a liquid crystal display, an electroluminescent light source, a photodiode, a charge couple device, and a photo electric cell.

18. The optical device of claim 14, wherein the method further comprises combining with the at least one optical feature the at least one of a mechanical device, an electrical device, an electro mechanical device, and an electronic device, and femtosecond laser subsurface laser machining at least one of the mechanical device, the electrical device, the electro mechanical device, and the electronic device.

19. The optical device of claim 18, wherein the method further comprises providing least one cavity and at least one seal to accommodate the at least one of the mechanical device, the electrical device, the electro mechanical device, and the electronic device.

* * * * *